United States Patent Office 3,316,165
Patented Apr. 25, 1967

3,316,165
METHOD FOR PREPARING DYEABLE POLYOLEFIN COMPOSITIONS
Charles R. Pfeifer, Newport News, Va., assignor to The Dow Chemical Company, Midland, Mich., a corporation of Delaware
No Drawing. Filed May 1, 1963, Ser. No. 277,127
10 Claims. (Cl. 204—159.17)

This invention relates to a method for modifying polymeric compositions to make them readily dyeable with conventional dyeing techniques. It particularly relates to a method for providing dyeable polyolefin compositions that are adapted to be dyed with basic dyes.

It is well known that polyolefins of both the aromatic and non-aromatic varieties are difficultly dyed. Particular difficulty in this regard has been encountered when attemps are made to dye the polyolefin compositions with basic dyes. Experience has shown that polyolefins have little or no receptivity for basic dyestuffs when normal dyeing procedures in an aqueous dyebath are employed. For example, when attempts are made to dye filaments or other shaped articles of polypropylene and the like polyolefins with a basic dye in water at or near 100° C., the polypropylene filaments are recovered from the bath either completely uncolored or, at best, perhaps lightly stained on the surface.

Several methods have been proposed to alleviate the aforementioned dyeing problems, especially with respect to polypropylene. Thus, one means has been to graft in some manner, a dyeable polymer onto the polypropylene base or other substrate polyolefin polymer (U.S. 2,837,496, Belgian Patents 558,004, 564,910). Another method advocates the use of oil soluble dyestuffs on the unmodified polymer (Belgian Patents 558,813; 562,893; 566,695). Still other proposed methods employ direct coloring, as by pigments or certain dyestuffs, the polyolefin melt as by pigments or certain dyestuffs, before fabricating the molten polymer into shapes (Belgian Patent 562,392). Yet another method is to manufacture the dye within the polyolefin (Belgian Patent 562,893). A still further method involves blending with the polyolefin a polymer that is more dyeable than the polyolefin (Belgian Patents 561,156, 563,123).

It is obvious to one skilled in the art that each of the above methods have one or more advantages and disadvantages when contrasted to one another. For instance, color matching and uniform mixing from one bath to another requires close and tedious control; contamination of the spinning equipment with color bodies or other foreign bodies requires clean-out labor and periods of inoperability; and frequently, the properties of the polyolefin product may be significantly downgraded due to the particular additive added; for example, when a dyeable polymer, e.g., a polymer of certain polymerizable organic sulfonic acids, is blended with the polyolefin the composition frequently becomes objectionably discolored when subjected to heat fabrication treatments.

In particular, regarding the grafting techniques, those techniques that require peroxidizing the polyolefin surface prior to contact with a monomer that is to be grafted onto the polyolefin polymer amounts to merely a surface treatment and the fiber or other article is only ring dyed. This is also frequently the case when grafting with high energy ionizing radiation, which, in addition may deteriorate the polymer. This latter technique additionally is quite expensive and requires elaborate handling and safety procedures. Other grafting methods which effect chain transfer and which use heat and air or a peroxide so that the polymer is molten and under shear are likely to cause severe discoloration due to the presence of the grafting monomer at the molten temperatures. Another problem that has been encountered when monomers are graft polymerized on to the polyolefin substrate to improve the dyeability of the polyolefin is that the light-fastness of the dyed product is inferior. This is particularly evidenced when certain organic sulfonic acids are employed as the monomer to be graft polymerized or at least polymerized in situ in the polyolefin. These sulfonic acids are found to be especially well adapted to enhance basic dyeability of polyolefin structures when polymerized therein. But, as will be more specifically pointed out hereinafter, ordinarily these dyed structures are significantly lacking in lightfastness properties, and this seems to persist even when the structure is totally and uniformly dyed throughout the entire mass.

Accordingly, it would be of great advantage, and it is the chief object and primary concern of the present invention, to provide a means for preparing olefin polymer structures containing certain sulfonic acid polymers that are readily and conveniently dyed to deep shades of coloration throughout and have excellent light stability properties, as well as to simultaneously avoid the above-mentioned processing disadvantages.

These as well as additional objects and advantages are obtained by practice of the present invention which comprises forming an intimate mixture of an aliphatic hydrocarbon olefin polymer and a porous, heat-stable polar inorganic solid, subjecting the mixture to a fabrication treatment to prepare a solid shaped article thereof, then impregnating the shaped article with a solution of a polymerizable organic sulfonic acid compound (i.e., sulfonated monomer), said solution having the capacity to at least partially swell the shaped article and to at least partially solubilize said organic sulfonic acid compound, and subsequently, exposing the so treated shaped article to ultraviolet light radiation to cause polymerization of the sulfonic acid compound. In general, it is preferable, after exposure to the ultraviolet light, to wash the article with a suitable solvent to remove any of the unreacted sulfonic acid material prior to subsequent processing, e.g., drying or dyeing.

The olefin polymer structures treated by the present invention are readily and efficiently dyed to deep shades of coloration, especially with basic dyes, with conventional and conveniently employed dyeing techniques. The articles are not merely surface dyed but can be made to be dyed throughout the entire article. This is particularly the case when the article is a textile fiber where thorough dyeability is of such importance. Of paramount significance is the fact that the dyed products prepared in accordance with the present invention have, to an unusual degree, excellent light-fastness properties, particularly when contrasted to products that are prepared with the sulfonated monomers but without the polar solid. Moreover, the present method does not in any way deleteriously affect the desirable properties of the olefin polymer. For instance, the physical properties of the olefin polymer before and after undergoing the present invention are the same for all practical purposes.

Advantageously, and beneficially, polymers of aliphatic olefins, including both mono- and di-olefins, such as ethylene, propylene, butylene and butadiene (including polymerizable mixtures thereof) and particularly alpha-olefins, which are so designated because of their terminally unsaturated configuration, are treated in accordance with the invention.

In a preferred embodiment of the invention, the aliphatic or non-aromatic hydrocarbon polyolefins that are prepared by polymerization of mono-olefinic aliphatic olefin monomers are employed in the method of the invention. Principally, olefin polymers of those mono-olefin aliphatic olefin monomers (including polymerizable mixtures thereof) that contain from 2 to about 8 carbon atoms, such as ethylene, propylene, butylene, 3-methyl-1-butene, 4-methyl-1-pentene and so forth, mixtures of ethylene and propylene and the like are utilized. Beneficially and advantageously, propylene is used.

The polypropylene or other non-aromatic hydrocarbon polyolefin that is preferably employed in the practice of the present invention, as mentioned, may be a polymer of any normally solid and film-forming nature. For example, the polymers of ethylene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150° and 275° C. or, if desired, the ethylene and propylene and other non-aromatic hydrocarbon olefin polymers may be essentially linear polymers, or polyolefin products similar to those materials. The essentially linear, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 grams per cubic centimeter; and melting points in the neighborhood of 125–135° C. They are also ordinarily found to have a more crystalline nature than conventional polyethylenes and may contain less than 3.0 and even less than 0.3 methyl radicals per 100 methylene groups in the polymer molecule. The essentially linear and unbranched polymers of ethylene and propylene and other non-aromatic hydrocarbon olefins may be obtained under relatively low pressures of 1 to 100 atmospheres using such catalysts for polymerizing the ethylene or propylene or other olefin as mixtures of strong reducing agents and compounds of Group IV-B, V-B and VI-B metals of the Periodic Systems; chromium oxide on silicated alumina; hexavalent molybdenum compounds; and charcoal supported nickel-cobalt.

The porous, heat-stable polar solid that is blended with the olefin polymer is inorganic in composition. Firstly, it should have the foregoing properties, and in addition, preferably be relatively uncolored itself. It must also be available or be conveniently made available in relatively minute size. Preferably, the size of the polar solid particles that are employed are smaller than about 50 microns. Particles of increasing size tend to make for non-uniformity in appearance as well as to degrade the physical properties of the fabricated product, and frequently cause non-uniform dyeing. When the mixture of polyolefin and the polar solid is fabricated from a melt the polar solid does not lose its identity but in general retains its same shape and characteristics throughout the fabrication process. As a matter of fact, it is apparently necessary that this be the case as will be discussed and demonstrated later herein. Any of such polar, solid, inorganic materials that are compatible with the olefin polymers (and the sulfonic acid monomer or polymers) so that there is no deleterious reaction between the solid and polymer can be utilized in practice of the present invention. Exemplary of such materials are titanium dioxide, zinc oxide, magnesium oxide, silica gel, molecular sieve (an artificially produced microporous sodium calcium alumina-silicate), bentonite, clays and fuller's earth of the montmorillonite group such as amargosite, beidellite, chroopal, erinite, hectorite, meta-bentonite, montmorillonite, nontronite, otaylite, and saponite, and the polygorskite group.

Beneficially, between about 0.25 and about 10 weight percent based on composition weight, of the polar solid material is incorporated with the polyolefin. Ordinarily, between about 0.5 and about 2 weight percent, based on composition weight, of the polar solid is employed. The exact amount that is employed may vary depending on the particular solid and the polyolefin, as well as the sulfonic acid compound that is to be impregnated into the article formed from the composition. Additionally, it may be necessary to take into consideration the geometrical configuration or size of the article to be formed. For example, when relatively fine denier fibers are sought, the amount of polar solid employed will tend toward the minimum end of the range. Generally, it is observed that when concentrations much less than about 0.25 weight percent are used the desirable fastness-property enhancements are not obtained. On the other hand, when concentrations much in excess of about 10 weight percent are employed, the physical properties of articles fabricated from the mixed compositions may be adversely affected.

In the preparation of the mixtures of polyolefin and polar solid it is preferable to dry blend the olefin polymer in powder or pulverulent form with the polar solid, which solid is, of course, a solid at normal conditions, and which is in a powdered or otherwise finely ground condition. This means of mixing is convenient whether the blended composition is to be fabricated into a shaped article by melt extrusion or whether it is to be first dissolved in a suitable solvent and then fabricated into a solid shaped article by evaporation or otherwise removal of the solvent. Other means can be used to incorporate the polar solid in the polyolefin composition. Among these methods are the addition of the inorganic polar solid to the polyolefin while the latter is in molten condition or dissolved in a solvent, either of which, if convenient and desirable, can be done during the later steps in the manufacture of the polyolefin. More frequently, the addition will be handled just prior to the fabrication treatment. Using any blending method, it is important that a relatively uniform mixture be attained.

The sulfonated monomers which are utilized to modify the non-aromatic hydrocarbon polyolefin substrates of the present invention may be any of those selected from the group consisting of sulfonated alkenyl aromatic monomers of the structural formula:

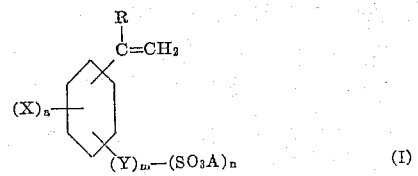

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, and alkyl radicals containing 1 to 5 carbon atoms; $a$ is an integer from 1 to 4; $m$ has a numerical value in whole units of 0 to 1; $n$ is an integer from 1 to 2; sulfonated olefin monomers of the structural formula:

$$CH_2=CZ-(Y)_m-(SO_3A)_n \qquad (II)$$

wherein Z is selected from the group consisting of hydrogen, chlorine, bromine, carboxyl radicals, aryl radicals containing from 1 to 8 carbon atoms, and Y, A, $m$ and $n$ are as defined above the monomer (I); and sulfonated acrylate and methacrylate monomers of the structural formula:

$$CH_2=CR-CO-Q-Y-(SO_3A)_n \qquad (III)$$

wherein Q is selected from the group consisting of divalent sulfur (—S—), oxygen (—O—) and amide nitrogen (—NR—); and R, Y, A, and n are as defined above for monomer (I).

The sulfonated aromatic and the sulfonated olefin monomers have been described and are involved in U.S. Patent No. 2,527,300. Typical of the various sulfonated monomers that may be employed with benefit in the practice of the present invention are those included in the following tabulations, grouped according to general type, wherein the advantageous species are designated by the symbol (F):

TABLE I

*Typical sulfonated aromatic monomers of formula (I)*

Para-styrene sulfonic acid (F)
Ortho-styrene sulfonic acid
Para-isopropenyl benzene sulfonic acid
Para-vinyl a-toluene sulfonic acid (F, with sodium salt)
Para-isopropenyl a-toluene sulfonic acid
Sodium para-styrene sulfonate (F)
Potassium ortho-styrene sulfonate
Methyl para-styrene sulfonate
Ethyl para-vinyl a-toluene sulfonate
Isopropyl para-isopropenyl benzene sulfonate
n-Butyl ortho-styrene sulfonate
2-chloro-4-vinylbenzene sulfonic acid
2-bromo-4-isopropenyl benzene sulfonic acid
3-vinyl toluene 6-sulfonic acid, sodium salt
3-ethyl-4-vinyl-benzene sulfonic acid
2,3-dichloro-4-vinyl benzene sulfonic acid
1,3-disulfo-2-(4-vinyl benzyl)propane

TABLE 2

*Typical sulfonated olefin monomers of the formula (II)*

Ethylene sulfonic acid (F)
Sodium ethylene sulfonate (F)
Potassium ethylene sulfonate
Methyl ethylene sulfonate
Isopropyl ethylene sulfonate
1-propene 2-sulfonic acid
1-propene 3-sulfonic acid
1-propene 3-sulfonic acid, ethyl ester (F)
1-butylene 4-sulfonic acid, n-butyl ester
1-butylene 3-sulfonic acid
2-methyl 1-propene 3-sulfonic acid

TABLE 3

*Typical sulfoalkylacrylates of the formula (III)*

2-sulfoethylacrylate (F)
2-sulfoethylmethacrylate, sodium salt
2-sulfoethylmethacrylate, methyl ester
2-sulfoethylmethacrylate, potassium salt
3-sulfopropylacrylate, sodium salt (F)
1,3-disulfo 2-propanol ester of methacrylic acid

TABLE 4

*Typical acryloyl taurines of the formula (III)*

N-acryloyl taurine (F)
N-acryloyl taurine, sodium salt
N-methacryloyl taurine, methyl ester
N-methacryloyl taurine, potassium salt
N-acryloyl taurine, ethyl ester (F)
N-acryloyl-aminopropane sulfonic acid
N-methacryloyl-aminopropane sulfonic acid, sodium salt As is apparent, the sulfonated monomers may be utilized in the form of any of their alkali metal salts, particularly their sodium salts, or in the form of their esters or as free acids.

The sulfonated monomer, as indicated, is impregnated into a shaped article of the polar solid-containing polyolefin. In accordance with the invention this is accomplished by dispersing the sulfonated monomer (most of which are solids under normal conditions) in a solvent that will at least partially swell the polyolefin. Some of the solvents that have the tendency to swell the polyolefin also have the capacity to sufficiently solubilize or disperse the sulfonated monomer so that adequate penetration of the monomer into the polyolefin is effectuated. However, most frequently this dual function of the solvent is not observed. The use of conventional dispersing or emulsifying agents are usually to be avoided since undesirable side effects are often encountered. Preferably, the sulfonated monomer is dissolved in a solvent that is mutually miscible with the liquid vehicle used to swell the polyolefin. This is for reasons that it is desirable that the impregnation of the sulfonated monomer be performed from the swelling medium instead of sequentially swelling and impregnating.

Exemplary of the solvents that may be used that have a swelling action on the polyolefin are aliphatic and cyclic hydrocarbons containing from about 6 to 10 carbon atoms, e.g., hexane, n-heptane, isoctane, cyclohexane, etc., benzene, toluene, xylene, and alkyl benzenes such as ethylbenzene, isopropylbenzene, beneficially, xylene is employed.

Advantageously, and by way of example, the solvents for the sulfonated monomer that are mutually miscible with such of the foregoing hydrocarbons are acetic acid, propionic acid, acetic anhydride and propionic anhydride.

It is important that agglomeration of the sulfonated monomer be avoided in the impregnating solution else uneven deposition of the monomer (from none to excessive) throughout or along the article is likely to result. This is best obviated by controlling the relative proportions of the monomer, monomer solubilizing agent, and polymer swelling agent. Ordinarily, an impregnating bath containing from about 0.5 to about 5 weight percent of the sulfonated monomer is sufficient to provide the results of invention. However, in ascertaining the most expeditious amounts to use account should be taken of the generally encountered interacting variables. These are that an increase of the monomer solubilizing medium may reduce the effectiveness of the swelling solvent, and reducing the amount of the solubilizing medium reduces the solubility of the sulfonated monomer which tends towards agglomeration thereof. From the teachings herein the artisan can adequately regulate the make-up of the impregnating medium.

The best means for providing sufficient impregnation of the sulfonated monomer into the polyolefin structure is, as mentioned, to totally immerse the article, or at least that portion of the article desired to be impregnated, into a sulfonated monomer-containing bath as herein described. The time that the article is in contact with the bath is not particularly critical and may vary a few seconds to several hours. The temperature of the bath has a more important bearing on results obtained. Profitably, the temperature of the bath should be between about 60 and 100° C., and preferably from about 65 to 95° C. The solvents employed will, of course, have some bearing on the temperature that is selected within this range. When temperatures much below about 60° C. are used the product is usually only surface dyed (in the case of fibers ring-dyeing usually results), and temperatures above about 100° C. tends to produce dissolving effects on the polyolefin in the medium of the impregnating.

Following the impregnation of the polar solid-containing polyolefin article with the sulfonated monomer, it is exposed to ultraviolet light rays. Beneficially, although not essential, after the article is removed from the monomer impregnation bath any occluded or extraneous liquid is removed from it prior to exposure to the ultraviolet light. This can be done by mechanical means such as shaking, squeezing or with an air stream or by rinsing with a suitable solvent. It is desirable to expose the impregnated article immediately after the impregnation or at east shortly thereafter so that it does not become unduly dried. Alternatively, suitable means can be employed to store the impregnated article under non-drying conditions prior to its exposure to the ultraviolet. Any suitable ultraviolet source can be employed that has sufficient intensity to initiate substantial and preferably essentially complete polymerization of the sulfonated monomer in the polyolefin article. Thus, carbon arc, mercury vapor and tungsten arc lamps can be employed as the ultraviolet source. Only a very short exposure time is necessary and, as indicated, only enough to actuate polymerization of the sulfonated monomer to polymer.

The exact nature of the polymerization of the monomer in situ in the article is not at this time entirely understood. The presence of the polar solid in the article apparently alters the ordinary polymer propagation that occurs in the absence of the solid (this will be made more evident in the example that follows).

The amount of the polymerized sulfonated monomer that is caused to be incorporated in the polyolefin structure can be up to about 20 weight percent, based on the weight of the total composition. However, ordinarily much smaller amounts are effective to produce the desirable results and between about 0.5 and about 5 weight percent, based on composition weight, of the polymerized sulfonated monomer is utilized in the practice of the invention.

Following the exposure it is desirable to rinse or wash the article with any suitable liquid to remove any unreacted monomer. This is not a necessary feature, however, and will depend principally upon the extent of polymerization. As mentioned, it is preferable to cause essentially complete polymerization of the sulfonated monomer. The article is then usually dried before dyeing. For instance, when the polyolefin article treated according to the present invention is a fiber, or usually, a bundle of filaments, the filament can be wound on a suitable spool and dried and stored for subsequent use in conventional textile treatments, such as stapling, weaving, knitting, etc. before being dyed. Or, instead of drying the filaments, they may be passed directly to the dyeing treatment.

The following examples further illustrate the invention wherein, unless otherwise specified, all parts and percentages are by weight.

EXAMPLE 1

Ten pounds of polypropylene having a melting point of 166–170° C.; melt index of 1.35 (determined with 2.16 kg. load at 190° C., ASTM method); tenacity, 5.1 grams/denier; and elongation, 25.5% were dry blended in powder form with 0.2 pound of finely divided titanium dioxide. The blended material was then reduced to a melt under nitrogen by heating to 300° C. over a period of 30 minutes. The melt at 300° C. containing about 2% titanium dioxide was then directly spun into filaments which were stretched about 4 times their original length into about 6 denier filaments having a tenacity of about 5.1 grams/denier and an elongation of about 26 percent. A bundle of 34 of these filaments was passed continuously from a spool into a bath containing about 1 part styrene sulfonic acid dissolved in about 24 parts of glacial acetic acid and 75 parts of o-xylene. The bath was maintained at 80° C. The filaments were passed through the bath at a rate such as to have about a one-minute immersion time in the bath. The filaments were then passed between a pair of squeeze rolls under light pressure to remove excess liquid. Following this the filaments were passed through a zone of ultraviolet light radiation which consisted of a pair of 100-watt H4AB bulbs (General Electric Co.) spaced 3 inches apart. The filaments were passed between these bulbs at a lineal rate of 3 inches/minute. The radiated filaments were then wound on a spool and vacuum dried overnight at 50° C. and 10 mm. Hg absolute pressure.

The filaments were then readily and efficiently dyed with such basic dyestuffs as:

| Dyestuff: | Color Index |
|---|---|
| Brilliant Green B | Basic Green 1. |
| Sevron Green B | Basic Green 3. |
| Sevron Brilliant Red 4G | Basic Green 14. |
| Genacryl Yellow 3G | Basic Green 11. |
| Sevron Brilliant Red B | None. |
| Genacryl Yellow 4G | None. |
| Victoria Blue B | Basic Blue 26. |
| Sevron Blue BGL | None. |

The filaments were dyed, for example, by immersing 0.5 grams of the filaments in a hot solution made up of 450 ml. of water, 0.375 ml. acetic acid, and 0.015 g. of Brilliant Green B dyestuff crystals. The temperature of the dyebath was maintained at 95–100° C. for about 15 minutes. After this time, the filaments were rinsed thoroughly with water and observed to be a deep, bright shade of green.

The filaments retained their deep green coloration even after prolonged washing in boiling water or in boiling water containing any of several common household detergents.

When the filaments dyed with the Brilliant Green B dyestuff were exposed to the illumination of a carbon arc and examined periodically for fading color, it was observed that the first detectable fading occurred between 10 and 15 hours. After 20 hours exposure the filaments were still dark green but the color was less intense than initially.

Similar excellent results were obtained with the samples dyed with other of the dyestuffs. For instance, the fibers dyed with the Victoria Blue B dyestuff did not evidence any change in color until after 15 hours exposure to the carbon arc illumination.

Microscopic examination of cross sections of the dyed filaments revealed that the particles containing the titanium dioxide were deeply colored, while the interparticle polymer matrix was almost uncolored. Even the particles imbedded deep in the filaments were deeply colored. To the unaided eye, however, the dyed filaments appeared uniformly colored throughout.

EXAMPLE 2

In contrast, filaments prepared and treated in a manner identical to that mentioned in Example 1, were prepared from polypropylene of the same master batch with the exception that no titanium dioxide was added prior to melt spinning.

In this case, the filaments, when dyed with Brilliant Green B, were deep, bright green. As in Example 1, the green color was not removed by prolonged washing in boiling water or in boiling water containing detergent. Microscopic examination of these filaments revealed some striking differences from those prepared in Example 1. The filaments were through-dyed (core of the filaments were dyed almost as intensely as the peripheral regions). The coloration under microscopic examination was not spotty (as in Example 1), but was uniform along the filament showing gradual, slight lightening in color going from skin to core of the filament.

When the dyed filaments prepared in the present example were exposed to the same carbon arc illumination as were those in Example 1, there was an abrupt fading of color within 1 hour exposure and, oftentimes, a complete whitening of the sample within 2 hours exposure.

When the procedure of Example 1 is repeated excepting to eliminate the impregnation with the styrene sulfonic acid and ultraviolet light treatment, in other words to dye the fibers after they have been spun with no further treatment, the fibers are dyed to a green coloration but to a significantly lighter shade than the dyed fibers of Example 1.

EXAMPLES 3-8

Polypropylene having the following properties:

| | |
|---|---:|
| Melting range °C | 166–170 |
| Density g./cc | 0.9143 |
| Vicat. Temp. °C | 141 |
| Melt index (190°, 2.16 kg. load) | 1.42 |
| Molecular weight [1] | 268,000 |
| Tensile modulus p.s.i | 83,000 |
| Tensile yield stress p.s.i | 4,640 |

[1] See Kinsinger & Hughes, J. Phys. Chem. 63, 2002–7 (1959).

was blended with 0.5% of the following substances:

| Example No. | Additive |
|---|---|
| 3 | Titanium dioxide. |
| 4 | Zinc oxide. |
| 5 | "Molecular sieve." [2] |
| 6 | Silica gel. |
| 7 | Magnesium oxide. |
| 8 | None. |

[2] A microporous sodium calcium alumino-silicate from Linde Chemical Corp.

These blends were then melt spun into filaments which could be stretched to between 6 and 7 times their lengths to form strong filaments characteristic of polypropylene. These filaments were then treated, as in Example 1, with styrene-sulfonic acid, acetic acid, and o-xylene followed by ultraviolet radiation and drying.

After dyeing with Brilliant Green B (as in Example 1), the treated filaments were subjected simultaneously to carbon arc illumination and observed periodically. The filaments from Examples 3–7 all retained their color significantly longer than did the control (Example 8). The observation made after two hours exposure serves to illustrate this. The samples containing titanium dioxide (Example 3) and zinc oxide (Example 4) were unchanged; the samples containing Molecular Sieve (Example 5), silical gel (Example 6), and magnesium oxide (Example 7) were slightly more faded increasing in the order named; and the control (Example 8) was completely faded, i.e., essentially white.

Microscopic examination of all the dyed filaments in Examples 3–8 revealed deeply colored particles in all of them except those from Example 8, which were uniformly colored even under microscopic examination.

Commensurate excellent results to the foregoing are obtained in the practice of the invention when other of the sulfonated monomers are employed including such ones as sulfoethylmethacrylate, ethylene sulfonic acid and the like, as well as when other in the aliphatic hydrocarbon polyolefins and polar solids are employed.

What is claimed is:

1. Method for the preparation of a dye-receptive, light-stable polyolefin shaped article which consists essentially of
   (a) forming an intimate mixture of from about 0.25 to about 10 weight percent, based on the weight of the mixture, of a finely divided, porous, heat stable, polar inorganic solid with a polymer of a 2 to 8 carbon atom aliphatic hydrocarbon olefin monomer;
   (b) subjecting said mixture to a fabrication treatment to form a shaped article thereof;
   (c) impregnating said shaped article with from about 0.5 to 20 weight percent, based on the total composition weight, of a sulfonated monomer from a solution having the capacity to at least partially swell said shaped article and to at least partially solubilize said sulfonated monomer, said solution being maintained at between about 60° and 100° C., and
   (d) subsequently, exposing said impregnated shaped article to ultraviolet light radiation to cause polymerization of said impregnated sulfonated monomer; said sulfonated monomer selected from the group consisting of sulfonated aromatic monomers of the structural formula:

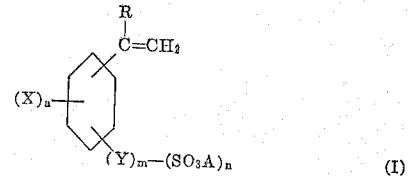

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, and alkyl radicals containing 1 to 5 carbon atoms; $a$ is an integer from 1 to 4; $m$ has a numerical value in whole units of 0 to 1; $n$ is an integer from 1 to 2; sulfonated olefin monomers of the structural formula:

$$CH_2=CZ-(Y)_m-(SO_3A)_n \qquad (II)$$

wherein Z is selected from the group consisting of hydrogen, chlorine, bromine, carboxyl radicals, carboxymethyl radicals, sulfo radicals, cyano radicals, aryl radicals containing from 6 to about 12 carbon atoms, and alkyl radicals containing from 1 to 8 carbon atoms; and Y, A, $m$ and $n$ are as defined above for monomer (I); and sulfonated acrylate and methacrylate monomers of the structural formula:

$$CH_2=CR-CO-Q-Y-(SO_3A)_n \qquad (III)$$

wherein Q is selected from the group consisting of divalent sulfur, oxygen, and amide nitrogen; and R, Y, A, and $n$ are as defined above for monomer (I).

2. The method of claim 1, wherein said polar solid is titanium dioxide.

3. The method of claim 1, wherein said polar solid is zinc oxide.

4. The method of claim 1, wherein said polyolefin is polypropylene.

5. The method of claim 1, wherein said sulfonated monomer is styrene sulfonic acid.

6. The method of claim 1, wherein said solution of (c) is a mixture of xylene and acetic acid.

7. The method of claim 1, wherein said solution of (c) is maintained at a temperature between about 65° and 95° C.

8. The method of claim 1, wherein between about 0.5 and about 2 weight percent, based on the weight of said mixture, of said polar solid is mixed with said polyolefin.

9. The method of claim 1, wherein said shaped article is a filamentary shaped article.

10. The method of claim 1, wherein said polyolefin is polypropylene and said shape darticle is a filamentary shaped article.

References Cited by the Examiner

UNITED STATES PATENTS

| | | | |
|---|---|---|---|
| 2,888,424 | 5/1959 | Precopio et al. | 260—41 |
| 2,951,821 | 9/1960 | Kresling | 260—41 |
| 2,987,501 | 6/1961 | Rieke et al. | 260—878 |
| 2,999,056 | 9/1961 | Tanner | 260—878 |
| 3,041,172 | 6/1962 | Evans et al. | 260—41 |
| 3,125,536 | 3/1964 | O'Brien | 260—41 |
| 3,226,454 | 12/1965 | Marans et al. | 260—878 |

SAMUEL H. BLECH, *Primary Examiner.*

MURRAY TILLMAN, *Examiner.*

N. F. OBLON, R. B. TURER, *Assistant Examiners.*